(12) United States Patent
Kuemmerling et al.

(10) Patent No.: US 10,795,384 B2
(45) Date of Patent: *Oct. 6, 2020

(54) UNIT FOR REGULATING AND CONTROLLING A FLUID PRESSURE

(71) Applicant: MANN+HUMMEL GmbH, Ludwigsburg (DE)

(72) Inventors: Volker Kuemmerling, Bietigheim-Bissingen (DE); Thomas Jessberger, Asperg (DE); Lukas Bock, Bietigheim-Bissingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 153 days.

This patent is subject to a terminal disclaimer.

(21) Appl. No.: 15/803,976

(22) Filed: Nov. 6, 2017

(65) Prior Publication Data

US 2018/0074527 A1 Mar. 15, 2018

Related U.S. Application Data

(63) Continuation of application No. PCT/EP2016/058771, filed on Apr. 20, 2016.

(30) Foreign Application Priority Data

May 6, 2015 (DE) .......................... 10 2015 005 692

(51) Int. Cl.
*G05D 16/06* (2006.01)
*F01M 13/00* (2006.01)
(Continued)

(52) U.S. Cl.
CPC ..... *G05D 16/0633* (2013.01); *F01M 13/0011* (2013.01); *F16K 7/17* (2013.01);
(Continued)

(58) Field of Classification Search
CPC ........ F01M 13/0011; F01M 2013/0016; F16K 7/17; F16K 17/0453; G05D 16/0633; G05D 16/0636
See application file for complete search history.

(56) References Cited

U.S. PATENT DOCUMENTS 1,410,070 A * 3/1922 Mueller ............. G05D 16/0663
137/505.37
2,351,135 A * 6/1944 Krugler ............. G05D 16/0655
137/505.21

(Continued)

FOREIGN PATENT DOCUMENTS

CN 201187335 Y 1/2009
DE 4446304 A1 6/1996
(Continued)

*Primary Examiner* — John M Zaleskas
(74) *Attorney, Agent, or Firm* — James Hasselbeck (57) ABSTRACT

A unit for regulating or controlling a fluid pressure has a valve housing with an inlet and an outlet. A switching film is disposed in the valve housing and switches at pressure differences of 1 mbar to 250 mbar for regulating, opening or blocking a flow of a fluid from the inlet to the outlet. The switching film is formed of a fluorine and carbon containing polymer material. The switching film has a plate-shaped flat body with a bending region and has a central closure region surrounded by the bending region. The bending region, when switching the switching film, moves the central closure region relative to a valve seat of the valve housing in an axial direction of the plate-shaped flat body toward or away from the valve seat by a low-stretch bending movement. A switching film for such a unit is provided also.

16 Claims, 3 Drawing Sheets

(51) Int. Cl.
*F16K 17/04* (2006.01)
*F16K 7/17* (2006.01)

(52) U.S. Cl.
CPC ..... *F16K 17/0453* (2013.01); *G05D 16/0636* (2013.01); *F01M 2013/0016* (2013.01)

(56) References Cited

U.S. PATENT DOCUMENTS

| | | | | |
|---|---|---|---|---|
| 3,090,402 | A * | 5/1963 | St Clair | G05D 16/0683 92/99 |
| 3,405,730 | A * | 10/1968 | Baumann | F16K 17/085 137/510 |
| 3,590,859 | A * | 7/1971 | Gotzenberger | F16K 31/1266 137/495 |
| 4,218,959 | A * | 8/1980 | Numaguchi | B29C 45/14336 92/103 SD |
| 4,238,992 | A * | 12/1980 | Tuck, Jr. | F04B 43/0054 92/103 SD |
| 4,344,456 | A * | 8/1982 | Hostetler | F16K 21/18 137/403 |
| 4,430,048 | A * | 2/1984 | Fritsch | F04B 43/0054 417/383 |
| 5,090,393 | A | 2/1992 | Holch | |
| 5,217,797 | A | 6/1993 | Knox et al. | |
| 5,335,641 | A | 8/1994 | Schnabel | |
| 5,349,896 | A * | 9/1994 | Delaney, III | F04B 43/0054 92/103 F |
| 5,941,505 | A | 8/1999 | Nagel | |
| 5,950,523 | A * | 9/1999 | Reynolds | F16J 3/02 92/103 F |
| 6,039,071 | A * | 3/2000 | Tomita | F16K 1/42 137/505.37 |
| 6,138,550 | A * | 10/2000 | Fingar, Jr. | F04B 43/0054 92/103 R |
| 6,158,423 | A | 12/2000 | Haack | |
| 6,230,609 | B1 * | 5/2001 | Bender | F04B 43/0054 92/103 R |
| 2004/0041119 | A1 * | 3/2004 | Christen | G05D 16/0633 251/331 |
| 2004/0103886 | A1 * | 6/2004 | Benjey | B60K 15/03519 123/520 |
| 2004/0187850 | A1 * | 9/2004 | Bergsma | B60K 15/03519 123/520 |
| 2004/0211400 | A1 * | 10/2004 | Basset | F01M 13/023 123/572 |
| 2005/0061305 | A1 * | 3/2005 | Pietschner | F01M 13/022 123/572 |
| 2006/0090737 | A1 | 5/2006 | Pietschner | |
| 2007/0023016 | A1 * | 2/2007 | Mills | A01D 34/82 123/520 |
| 2008/0196364 | A1 | 8/2008 | Brand et al. | |
| 2008/0223368 | A1 * | 9/2008 | Hoffmann | A61M 16/20 128/205.24 |
| 2009/0053081 | A1 * | 2/2009 | Griffiths | F04B 43/0054 417/413.1 |
| 2009/0137940 | A1 * | 5/2009 | Orr | A61M 1/1062 604/6.11 |
| 2009/0146095 | A1 * | 6/2009 | Baril | F16K 7/17 251/331 |
| 2009/0308337 | A1 * | 12/2009 | Imhof | F01M 13/0011 123/41.86 |
| 2011/0174397 | A1 * | 7/2011 | Goerlich | F01M 13/0011 137/535 |
| 2013/0239932 | A1 * | 9/2013 | Jessberger | F01M 13/0011 123/572 |
| 2014/0061525 | A1 * | 3/2014 | Matalon | F16K 7/126 251/331 |
| 2014/0165977 | A1 | 6/2014 | Copley et al. | |
| 2015/0275718 | A1 * | 10/2015 | Jessberger | F02M 25/06 123/574 |
| 2017/0284244 | A1 * | 10/2017 | Bock | F01M 13/0011 |
| 2018/0119586 | A1 * | 5/2018 | Bock | F01M 13/0011 |
| 2018/0119660 | A1 * | 5/2018 | Bock | F01M 13/023 |
| 2018/0119835 | A1 * | 5/2018 | Bock | G05D 16/0658 |
| 2018/0120867 | A1 * | 5/2018 | Bock | G05D 16/0641 |
| 2018/0120868 | A1 * | 5/2018 | Bock | B23K 20/10 |
| 2018/0120869 | A1 * | 5/2018 | Bock | B23K 20/10 |
| 2018/0120870 | A1 * | 5/2018 | Bock | B23P 15/001 |

FOREIGN PATENT DOCUMENTS

| | | | |
|---|---|---|---|
| DE | 19512722 C1 | 11/1996 | |
| DE | 10061307 A1 | 7/2002 | |
| DE | 10254626 A1 * | 6/2004 | .......... F01M 13/023 |
| DE | 102006061690 A1 * | 7/2008 | .......... F02M 55/002 |
| DE | 102013007264 A1 | 1/2014 | |
| EP | 1813785 A1 | 8/2007 | |
| GB | 190912171 A * | 11/1909 | .............. F22D 5/18 |
| GB | 1579160 A | 11/1980 | |
| JP | 2008121703 A | 5/2008 | |
| WO | WO-2007017033 A1 * | 2/2007 | ......... F01M 13/0011 |

* cited by examiner

Fig. 4 ic application No. PCT/EP2016/058771 having an international filing date of 20 Apr. 2016 and designating the United States, the international application claiming a priority date of 6 May 2015, based on prior filed German patent application No. 10 2015 005 692.1, the entire contents of the aforesaid international application and the aforesaid German patent application being incorporated herein by reference.

UNIT FOR REGULATING AND CONTROLLING A FLUID PRESSURE

CROSS-REFERENCE TO RELATED APPLICATIONS

This application is a continuation application of international application No. PCT/EP2016/058771 having an international filing date of 20 Apr. 2016 and designating the United States, the international application claiming a priority date of 6 May 2015, based on prior filed German patent application No. 10 2015 005 692.1, the entire contents of the aforesaid international application and the aforesaid German patent application being incorporated herein by reference.

BACKGROUND OF THE INVENTION

The invention concerns a unit for regulating or controlling a fluid pressure, in particular for the pressure regulation of the internal combustion engine and/or of the crankcase of the internal combustion engine of a motor vehicle.

Pressure regulating valves are used, for example, in the venting line between crankcase and the intake manifold of an internal combustion engine. In this context, the task is to prevent the pressure or vacuum in the containers to be vented from rising beyond a predetermined value.

In internal combustion engines, blow-by gases occur that are generated in that combustion gases in the cylinder bypass the cylinder piston and reach the crankcase. These blow-by gases cause the pressure in the crankcase to rise which may result in leakages and escape of oil. In order to avoid a pressure increase and to discharge the blow-by gases in an environmentally friendly way, the latter are returned from the crankcase into the air intake manifold of the internal combustion engine. On the other hand, the specified vacuum value should not be significantly undershot because otherwise, due to leaks, undesired infiltration air would be sucked into the crankcase.

In case of the pressure regulating valves which are employed currently, usually a switching film, known to a person of skill in the art also under the term "switching membrane", of elastomer, frequently fluorosilicone rubber (FVMQ), is used. These switching films are very flexible due to the specific properties of elastomers. As a function of the applied pressure ratios, this switching film opens or closes an opening in the pressure regulating valve. The pressure ratio results usually from the pressure difference between the applied pressure in a first chamber and the pressure present in a second chamber of the pressure regulating valve. The pressure in the first chamber can be, for example, equal to the atmospheric pressure. The switching film must react to minimal switching pressures in the magnitude of 1 mbar to 250 mbar.

Blow-by gases are comprised of uncombusted fuel proportions, motor oil proportions, and other pollutants which are produced during combustion. These gases attack many elastomer types so that the material properties may become damaged. The components of these materials become brittle, porous, and cracked. When the switching films are damaged, the environmentally damaging blow-by gases reach directly the environment because the system is no longer seal-tight. The switching film of an elastomer is usually designed as a roll film in order to realize a certain stroke of the film. The material in the rolling region is additionally mechanically loaded by the rolling movement, while simultaneously contacted by blow-by gases, and can thus be damaged.

DE 26 29 621 A1 discloses a film valve, known to a person of skill in the art by the term "membrane valve", with a film which is clamped at its rim between the valve housing and the housing cover and, by means of a pressure member, is to be brought into sealing contact on a seat surface provided at the valve housing, wherein the film is comprised of a thinner layer of minimal elasticity, for example, PTFE, that is facing the housing interior and is resistant against aggressive flow media, and of a further thicker layer of elastic rubber material. Such film valves are used primarily where a high chemical resistance of the materials coming into contact with the flow medium is required. Since elastic rubber materials do not fulfill this requirement and the chemically resistant materials such as PTFE do not have the required elasticity for proper functioning, films comprising two layers are employed. By means of the thick rubber-like layer, the contact pressure exerted by the pressure member is transmitted as uniformly as possible to the sealing surface of the switching film interacting with the seat surface in the valve housing. In this context, for closing the two-layer film, relatively great switching pressures of several bar are exerted on the film by a pressure spindle connected with a handwheel in order to ensure the required sealing function by means of the stiff PTFE layer.

SUMMARY OF THE INVENTION

It is an object of the invention to provide a unit for switching at low pressure differences which achieves long service lives in operation in an internal combustion engine with aggressive blow-by gases.

A further object of the invention is to provide a switching film for such a unit for switching at low pressure differences which achieves long service lives in operation in an internal combustion engine with aggressive blow-by gases.

The aforementioned object is solved according to one aspect of the invention by a unit for regulating or controlling a fluid pressure, with a valve housing comprising an inlet and an outlet for the fluid, as well as with a switching film wherein the switching film is formed of a fluorine and carbon comprising polymer film.

According to another aspect of the invention, the further object is solved by a switching film for such a unit of a fluorine and carbon comprising polymer film.

Beneficial embodiments and advantages of the invention result from the additional claims, the description, and the drawing.

A unit for regulating or controlling a fluid pressure is proposed, with a valve housing comprising an inlet and an outlet for the fluid, as well as with a switching film for switching at pressure differences of 1 mbar to 250 mbar, preferably of 1 mbar to 100 mbar, for releasing or blocking a flow of the fluid between the inlet and the outlet, wherein the switching film is formed of a fluorine and carbon comprising polymer film. The unit serves not only for releasing or blocking a flow but also regulates, between the two switching states release or blocking, the flow of the fluid between the inlet and the outlet by a continuous change of the flow cross section as a function of the pressure difference.

The fluorine and carbon comprising polymer film is chemically resistant and can switch many switching cycles of the film valve. The long-term stability of the unit is improved. In particular, the fluorine and carbon comprising polymer can be PTFE (polytetrafluoroethylene). Alternatively, the fluorine and carbon comprising polymer can be PTFE as base material with admixtures added; also, the fluorine and carbon comprising polymer can be a thermoplastically processible PTFE.

By means of a spring element which is supported on the valve housing, a force is exerted in this context on the switching film in order to adjust the regulating behavior of the unit in a suitable way. The outlet comprises a valve seat at an end arranged in the valve housing which is closable by the closure region of the switching film, whereby a conveyance of the fluid from the inlet to the outlet can be regulated.

According to an advantageous embodiment, the switching film can have a plate-shaped flat body with a bending region surrounding a central closure region wherein the bending region, when switching the switching film, moves the closure region by a low-stretch bending movement, i.e., for practical application practically stretch-free, in particular stretch-free, relative to a valve seat in axial direction toward the valve seat or away from the valve seat. Since the switching film in this configuration can bend not only in a small surface area but across a large surface area due to the plate-shaped form, individual regions of the switching film are only minimally stretch-loaded. The bending movement is thus executed across a large region of the switching film and therefore with minimal elastic deformation in the form of a curvature change with minimal stretching, for example, less than 10%.

According to an advantageous embodiment, the bending region can extend in radial direction in a corrugated shape about the closure region. The bending region comprises in this context expediently at least one radially arranged corrugation about the closure region, wherein this one or a plurality of corrugations are formed as concavely or convexly extending curvature regions with alternatingly arranged elevations and depressions of the switching film. In this context, an elevation at one flat side of the switching film corresponds to a depression on the other flat side of the switching film. The term corrugated shape is to be understood not only as sinuous-shaped corrugations but may also encompass, for example, U-shaped or other concavely or convexly curved contours. A curved deflection to only one side of an imaginary film plane also constitutes a corrugation. In this way, a beneficial bending behavior with uniform force path and simultaneously minimal to no stretching at all of the fluorine and carbon comprising polymer film can be achieved, i.e., due the geometry of the bending region the central region of the switching film can be moved in axial direction with low-stretch movement i.e., for practical application practically stretch-free, or even stretch-free. Also, movements of the fluorine and carbon comprising polymer film can be effected even for very minimal pressure differences between front side and back side of the film. In this way, switching of the valve for a pressure difference of less than 250 mbar is possible.

A conventional switching film of elastomer of a conventional unit for the pressure regulation of an internal combustion engine and/or the pressure regulation of the crankcase of an internal combustion engine is replaced therefore by a film of a fluorine and carbon comprising polymer. A fluorine and carbon comprising polymer material such as PTFE can be produced by a sintering process and subsequently mechanically processed. Such a film is very stiff in its normal form and not suitable for flexible components. PTFE comprises an excellent chemical resistance and is usable in a very broad temperature range wherein the elastic modulus greatly increases toward low temperatures in comparison to elastomer materials. For this reason, PTFE is rather not suited for use as a film in the temperature range ($-40°$ C. to $+150°$ C.) required in automotive applications on internal combustion engines. This disadvantage is advantageously circumvented in the unit according to the invention by a special geometry and optionally by extremely thin wall thicknesses of the film of fluorine and carbon comprising polymer. By a reduction of the wall thickness of the PTFE material in a movable region to a few tenths of a millimeter, wherein the immobile sealing region as well as the clamping region of the material can even be embodied thicker, and a specially developed geometry of the film without rolling region, as it is usually employed in the prior art, the stiff material can be brought into a shape in which it has the required flexibility but despite of this still fulfills the mechanical requirements with regard to crack formation, stretching, and bending fatigue strength. Due to the special geometry, no rolling movement occurs anymore but instead a low-stretch bending movement with a radii change with which a stroke movement of the switching film for a unit can be realized.

According to an advantageous embodiment, the switching film has a substantially constant thickness across its entire expansion. This means that perpendicular to its flat expansion the switching film is substantially of the same thickness, i.e., the switching film in the rim area is at most twice as thick as in the bending region. This can be achieved advantageously in that the switching film is produced by a forming process, in particular by deep drawing. In this context, the bending region can be somewhat thinner than the rim region of the switching film. Preferably, the switching film is at most 0.5 mm thick. By elimination of regions with a locally limited, significantly increased material thickness, as known, for example, in known switching membranes of elastomer, such a switching film in contrast thereto can be produced in a simple way with a material thickness that is uniform for practical considerations. In elastomer membranes, the thickness of the membrane varies typically by a multiple of the thickness of thinner regions because elastomer membranes typically are produced by a master forming process, for example, by vulcanization of the elastomer in a pressing tool.

According to an advantageous embodiment, a spring element which is supported on the valve housing can be provided that exerts a force on the closure region of the switching film. The spring element exerts in this context the suitable counterforce on the switching film in order to achieve the regulating behavior of the unit in the desired pressure range. The side of the switching film which is facing away from the fluid to be regulated is usually loaded in this context with atmospheric pressure.

According to an advantageous embodiment, the spring element can be supported by a plate at the closure region. In this way, a stable contact of the spring element at the switching film is achieved so that a defined force introduction into the switching film is ensured. At the same time, the switching film, which is embodied according to the invention as a thin fluorine and carbon comprising polymer film, is protected thereby from possible damage by means of the spring element.

According to an advantageous embodiment, the closure region can have a cup-shaped bulge. Due to the cup-shaped bulge, a stable shape of the closure region is achieved whereby a reliable sealing action can be ensured when the closure region bears on the valve seat. In this context, the bulge itself is not affected in its shape by the bending movement of the switching film and maintains the shape for the reliable sealing effect.

According to an advantageous embodiment, the spring element can be arranged about the cup-shaped bulge. In this way, a uniform force introduction from the spring element into the switching film is achieved wherein the closure region formed as a bulge is not affected by the force introduction in respect to its shape. This is ensured all the more because the plate of the spring element is placed in an annular shape about the bulge so that the plate additionally stabilizes the shape of the bulge. In this context, the bulge as a closure region is arranged in an inner region of the spring element.

According to an advantageous embodiment, the spring element can be embedded by injection molding at its end face which is facing the bulge. Also, a realization of the plate of the spring element in the form of embedding in plastic material can be very expedient and can effect beneficially a connection of the spring element with the switching film. Also, the fluorine and carbon comprising thin polymer film is additionally protected in this way from mechanical loading in the region of the spring element.

According to an advantageous embodiment, a first chamber of the unit can be loaded with atmospheric pressure. For an effective regulating behavior of the unit, the switching film should be movable as freely as possible for which purpose a first chamber, which is separated by the switching film from a second chamber in which the fluid to be regulated is located, is expediently in communication with the environment, i.e., the atmospheric pressure. The spring element compensates in this context the atmospheric pressure so that the regulating behavior of the switching film can be realized in a low pressure difference range.

According to an advantageous embodiment, the switching film can be movable without tappet between its maximum positions in the open state and the closed state. Opening and closing of the switching film can be realized without a movable contact tappet ever acting from both sides on the switching film and moving the latter into one or the other direction. Instead, the switching film can be moved back and forth solely by a pressure difference at both sides of the switching film.

Alternatively, it can be provided that the switching film is movable back and forth between its maximum positions in the closed state and the open state by means of movable mechanical actuating means, for example, tappets, acting on the switching film.

According to an advantageous embodiment, the closure region of the switching film can interrupt the flow of the fluid between the inlet and the outlet. The switching film can be contacting immediately a sealing seat in order to interrupt the flow.

According to an advantageous embodiment, the switching film can be moveable between its maximum positions in the open state and the closed state in that on one side of the switching film atmospheric pressure is applied as control pressure. Advantageously, the switching film is self-regulating and the switching film can be indirectly closed by means of a pressure difference between atmospheric pressure in one chamber of the unit and a working pressure in the other chamber of the unit. The working pressure can be, for example, a pressure in a crankcase of an internal combustion engine.

According to an alternative embodiment, the switching film can be moveable between its maximum positions in the open state and the closed state in that on one side of the switching film a control pressure different from an atmospheric pressure is applied and/or a mechanical actuating means is provided for switching the switching film.

According to an advantageous embodiment, the switching film, at least in the bending region, can have a thickness of at most 0.5 mm, preferably of at most 0.3 mm, particularly preferred of at most 0.2 mm. With such a minimal thickness of the fluorine and carbon comprising polymer film, for example, PTFE film or PTFE containing film, it can be achieved that the film can bend easily enough at low differential pressures without experiencing significant stretching in the process. Advantageously, corrugated bending region and minimal thickness of the film can interact in order to enable minimal switching pressures. The film can ensure the desired switching behavior by closing off the valve seat with the closure region of the switching film. In contrast to folded bellows regions, usually arranged at thicker PTFE components and produced by mechanically cutting or machining and enabling a movement of the stiff PTFE material, such a construction is not necessary in case of such a thin fluorine and carbon comprising polymer film because the bending movement is enabled solely by the plate-shaped configuration with radially arranged corrugated regions of the switching film.

According to an advantageous embodiment, the switching film can have a diameter between 40 mm and 100 mm, preferably between 50 mm and 80 mm. Switching films with the specified diameter achieve in connection with the afore specified film thicknesses a sufficient bending movement freedom in order to reach the desired regulation behavior in a unit at the desired low pressure differences. Accordingly, venting valves for conventional internal combustion engines in the automotive field can be efficiently realized. It is conceivable that also somewhat greater thicknesses of the switching film in the range of above 0.5 mm, for example, at most 1 mm to 0.5 mm, can be realized with corresponding greater diameters.

According to a further aspect of the invention, a switching film for a unit is proposed that is formed of a fluorine and carbon comprising polymer film, with a plate-shaped flat body, with a bending region which is surrounding a central closure region, wherein the closure region for switching of the switching film is movable back and forth by a low-stretch, in particular stretch-free, bending movement of the bending region in the axial direction. Since the switching film in this configuration not only can bend in a small surface area but across a large surface area due to the plate-shaped form, individual regions of the switching film are stretch-loaded only minimally. The bending movement is thus performed across a great region of the switching film and therefore with minimal curvature.

According to an advantageous embodiment, the bending region can extend in the radial direction in corrugated shape about the closure region. In this context, the bending region comprises expediently at least one radially arranged corrugation about the closure region wherein this one or a plurality of corrugations are embodied as concavely or convexly extending curvature regions with alternatingly arranged elevations and depressions of the switching film. In this context, a bulge on one flat side of the switching film corresponds to a depression on the other flat side of the switching film. In this way, a beneficial bending behavior with uniform force path with simultaneous minimal stretching (low-stretch) up to no stretching at all (stretch-free) of the fluorine and carbon comprising polymer film can be achieved, i.e., due the geometry of the bending region the central region of the switching film can be moved in a low-stretch or even stretch-free way in axial direction. Also, movements of the fluorine and carbon comprising polymer film at very small pressure differences between front side and back side of the film can be effected in this way.

According to an advantageous embodiment, the central closure region can bulge in a cup shape. Due to the cup-shaped bulge, a stable shape of the closure region is achieved so that a reliable sealing action upon bearing of the closure region against the valve seat can be ensured. The bulge itself is not affected by the bending movement of the switching film in regard to its shape and maintains the shape for the reliable sealing effect.

According to an advantageous embodiment, at least the bending region can have a thickness of at most 0.5 mm, preferably of at most 0.3 mm, particularly preferred of at most 0.2 mm, and the flat body can have in particular a diameter that is less than 150 mm, preferably between 40 mm and 100 mm, particularly preferred between 50 mm and 80 mm. With such a minimal thickness of the fluorine and carbon comprising polymer film, it can be achieved that the film can bend sufficiently easily at low differential pressures without thereby experiencing significant stretching. It is conceivable that also somewhat greater thicknesses of the switching film in the range of more than 0.5 mm, for example, at most 1 mm to 0.5 mm, can be realized for corresponding greater diameters.

The film can ensure the desired switching behavior by closure of the valve seat with the closure region of the switching film. In contrast to folded bellows regions, which are usually arranged in connection with thicker PTFE films and enable movement of the stiff PTFE material, such a construction is not necessary for such a thin film comprised of a fluorine and carbon comprising polymer because the bending movement is enabled solely by the plate-shape configuration with radially arranged corrugated regions of the switching film. Switching films of the specified diameter achieve for the afore specified film thicknesses sufficient bending movement freedom in order to achieve the desired regulating behavior in a unit at the desired low pressure differences. In this way, venting valves for conventional internal combustion engines in the automotive field can be efficiently realized.

According to a further aspect of the invention, the unit according to the invention is used for pressure regulation of an internal combustion engine and/or for pressure regulation of a crankcase of an internal combustion engine.

BRIEF DESCRIPTION OF THE DRAWINGS

Further advantages result from the following description of the drawings. In the drawings, embodiments of the invention are illustrated. The drawings, the description, and the claims contain numerous features in combination. A person of skill in the art will expediently consider the features also individually and combine them to meaningful further combinations.

DETAILED DESCRIPTION

In the Figures, same or same type components are identified with same reference characters. The Figures show only examples and are not to be understood as limiting.

Figure 1:
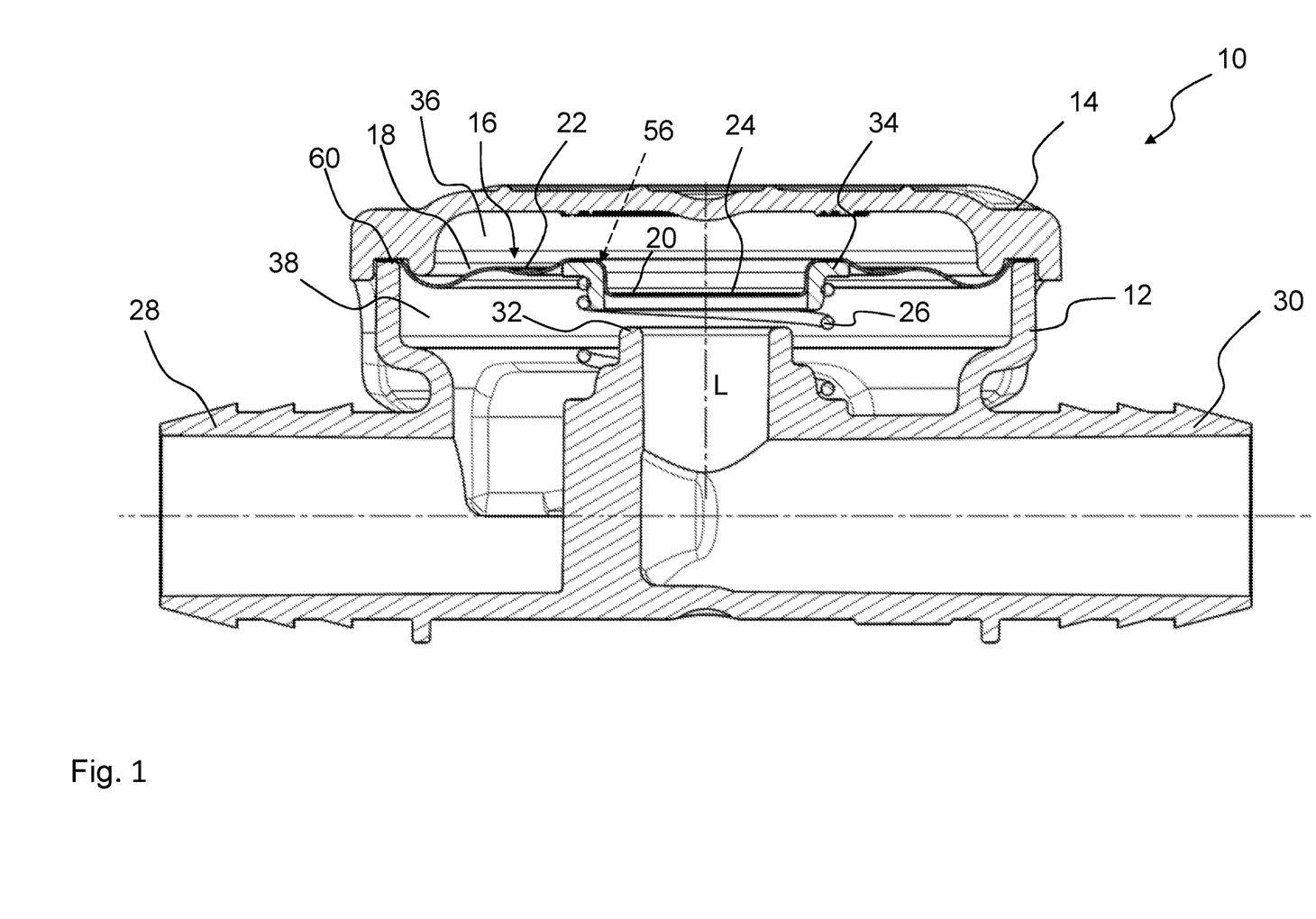
FIG. 1 shows a unit with a switching film of a fluorine and carbon comprising polymer according to an embodiment of the invention in a section illustration.

FIG. 1 shows in a section illustration a unit 10 for regulating or controlling a fluid pressure by means of the switching film 22 of a fluorine and carbon comprising polymer according to an embodiment of the invention. This unit 10 serves for regulating or controlling a fluid pressure, in particular for use for pressure regulation of an internal combustion engine and/or for pressure regulation of a crankcase of an internal combustion engine. The unit 10 comprises a valve housing 12 with a housing cover 14, wherein the valve housing 12 comprises an inlet 28 and an outlet 30 for the fluid. The switching film 22 is formed of a fluorine and carbon comprising polymer film, for example, PTFE, and is clamped with a clamping region 60 between valve housing 12 and housing cover 14. The switching film 22 separates a first chamber 36 from a second chamber 38. A pressure difference is existing between first chamber 36 and second chamber 38 wherein the first chamber 36 is in communication (not illustrated) with the environment, i.e., the atmospheric pressure. The switching film 22 can be moved with pressure differences of 1 mbar to 250 mbar, preferably of 1 mbar to 100 mbar, and serves for releasing or blocking flow of the fluid between the inlet 28 and the outlet 30. In use, the inlet 28 of the unit 10 is connected fluidically, for example, with the crankcase of an internal combustion engine while the outlet 30 is connected fluidically with the intake manifold. The switching film 22 comprises a plate-shaped flat body 16 with a corrugated bending region 18 that surrounds a centrally arranged closure region 24. When switching the switching film 22, the bending region 18 moves the closure region 24 relative to a valve seat 32 in axial direction L toward the valve seat 32 or away from the valve seat 32 by a low-stretch, in particular stretch-free, bending movement. The switching film 22 comprises for this purpose at least in the bending region 18 a thickness of at most 0.5 mm, preferably of at most 0.3 mm, particularly preferred of at most 0.2 mm. The diameter of the switching film 22 is in this context between 40 mm and 100 mm, preferably between 50 mm and 80 mm.

The bending region 18 extends in radial direction in a corrugated shape about the closure region 24, wherein a depression on one flat side corresponds to an elevation on the other flat side of the switching film 22. The closure region 24 closes off the valve seat 32 fluid-tightly when it is resting against the valve seat 32. A spring element 26 which is supported on the valve housing 12 is provided that exerts a force on the closure region 24 of the switching film 22 and in this way compensates the atmospheric pressure in the first chamber 36. The spring element 26 in this context is supported by an annular plate 34 at the closure region 24. The closure region 24 is embodied as a cup-shaped bulge 20 of the switching film 22 wherein the plate 34 in the form of a support ring frames annularly this bulge 20. The spring element 26 can engage alternatively without plate 34 the switching film 22 and in this context can be embedded at its end face which is facing the bulge 20 by injection molding for protection of the switching film 22 so that embedding can replace the plate 34. The rim 56 between the flat part of the switching film 22 and the bulge 20 is matched to the plate 34 so that the switching film 22 can directly contact the plate 34. The spring element 26 is therefore arranged about the cup-shaped bulge 20 which is extending into the interior of the spring element 26.

Figure 2:
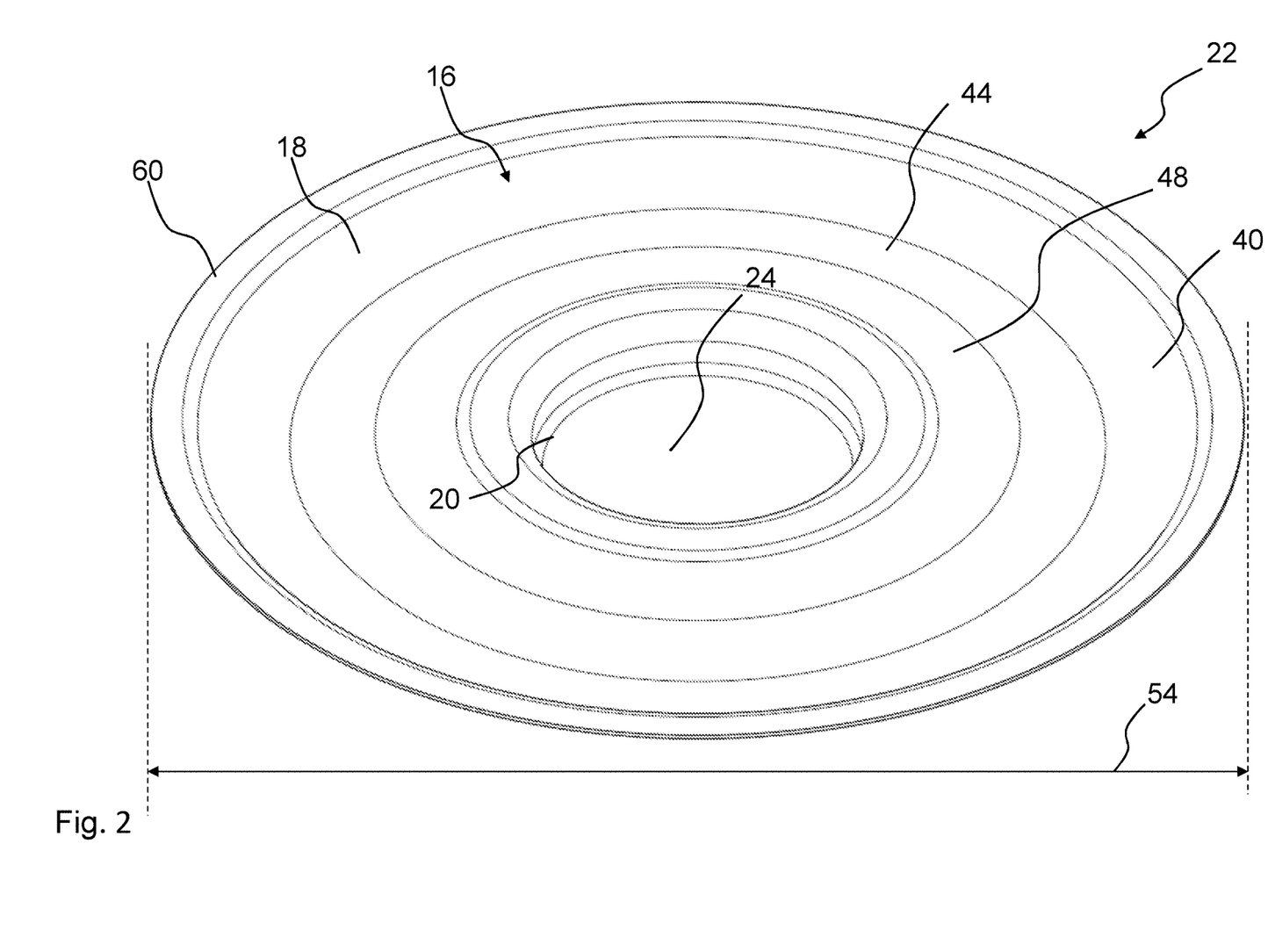
FIG. 2 shows a switching film of a fluorine and carbon comprising polymer according to an embodiment of the invention in isometric view.

FIG. 2 shows a switching film 22 of a fluorine and carbon comprising polymer film according to an embodiment of the invention in isometric view. The switching film 22 for a unit 10 is formed of a fluorine and carbon comprising polymer film, for example, PTFE, with a plate-shaped flat body 16, with a bending region 18 surrounding a central closure region 24, wherein the closure region 24 for switching the switching film 22 is reciprocatingly movable by a low-stretch, in particular stretch-free, bending movement of the bending region 18 in axial direction L. The central closure region 24 is realized as a cup-shaped bulge 20. The diameter 54 of the switching film 22 is between 40 mm and 100 mm, preferably between 50 mm and 80 mm. The bending region 18 extends in radial direction in a corrugated shape about the closure region 24. In the embodiment of FIG. 2, three corrugations 40, 44, 48 are illustrated which are arranged concentrically about the closure region 24 and have opposite curvatures, respectively, so that a bending movement of the flat body 16 is favored in this way.

Figure 3:
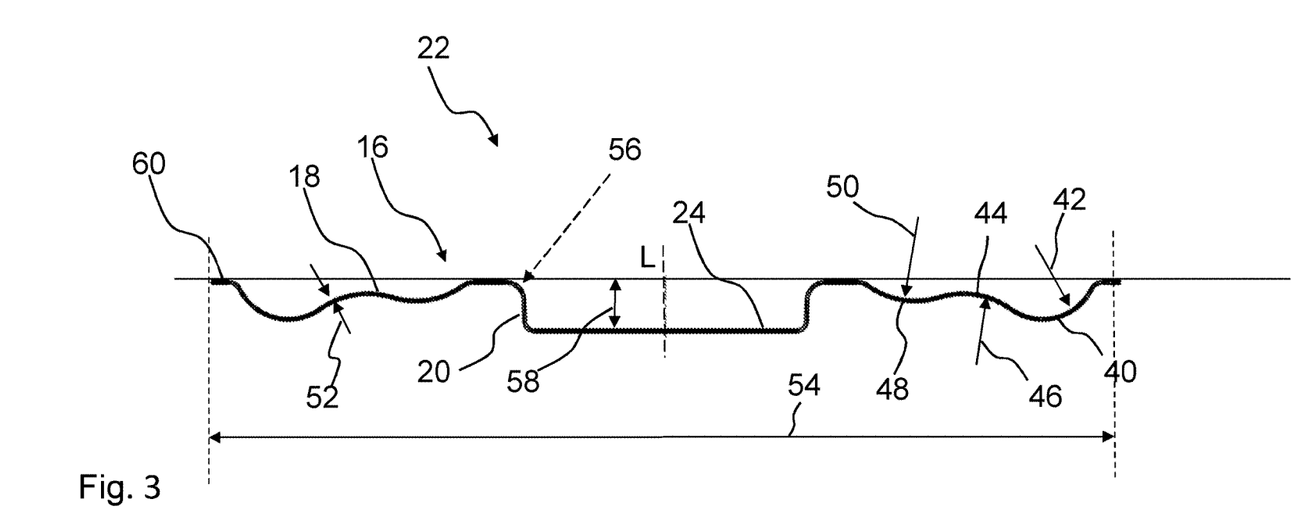
FIG. 3 shows the switching film of FIG. 2 in unloaded state in longitudinal section.

FIG. 3 shows the switching film 22 of FIG. 2 in the unloaded state in longitudinal section. In the unloaded state, the rim 56 is positioned between the flat region of the switching film 22 and the cup-shaped bulge 20 at the same level as the outer clamping region 60. The bending region 18 is formed of three corrugations 40, 44, 48 which are embodied with their radii 42, 46, 50 in alternating sequence convexly, concavely, and convexly, viewed from the first chamber 36 of the unit 10. At least in the bending region 18, the thickness 52 of the fluorine and carbon comprising polymer film is in the range of at most 0.5 mm, preferably of at most 0.3 mm, particularly preferred of at most 0.2 mm. The flat body 16 of the switching film 22 in FIG. 3, as illustrated, has in particular a diameter 54 that is between 40 mm and 100 mm, preferred between 50 mm and 80 mm.

Figure 4:
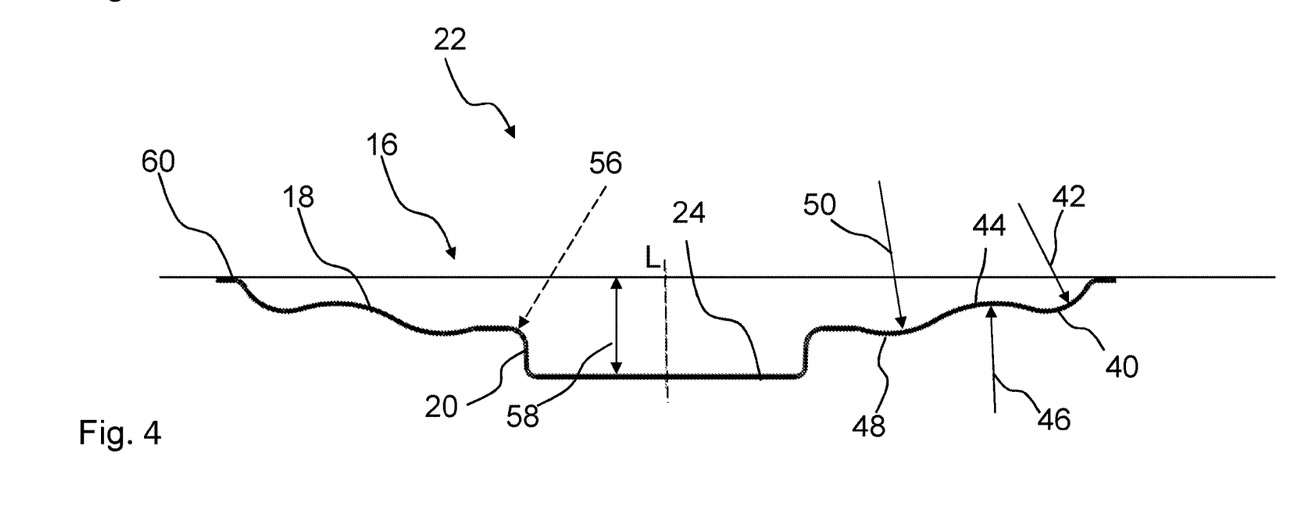
FIG. 4 shows the switching film of FIG. 2 in deflected state in longitudinal section.

FIG. 4 shows the switching film of FIG. 2 in the deflected state in longitudinal section. The closure region 24 is significantly lowered and, in the unit 10 in FIG. 1, would thus be contacting, for example, the valve seat 32. The lowering movement of the closure region 24 is effected by the bending movement of the switching film 22 by radii extension of the three radii 42, 46, 50 of the three corrugations 40, 44, 48 which are each arranged in radial arrangement concentrically about the closure region 24. The arrows that symbolize the radii 42, 46, 50 are meant to express the radii extension. As shown in FIG. 3, the stroke 58 of the closure region 24 is significantly enlarged relative to the stroke 58 of the switching film 22 illustrated in FIG. 2 in the unloaded state. The rim 56 between the flat region of the switching film 22 and the closure region 24 maintains, on the other hand, the approximately rectangular shape despite the bending movement because the flat body 16 of the switching film 22 has an expansive bending region 18 and the curvature of the entire bending region 18 therefore exhibits a very large curvature radius.

What is claimed is:

1. A switching film for a unit regulating or controlling a fluid pressure and having a valve housing with an inlet and an outlet, the switching film comprising:
    a plate-shaped flat body of a polytetrafluoroethylene (PTFE) material, comprising:
        a bending region having a plurality of corrugations are formed as concavely or convexly extending curvature regions;
        a central closure region surrounded by the bending region,
        wherein a thickness of the bending region has a reduced thickness of at most 0.3 mm, thinner than a remainder of the switching film; and
        a rim region surrounding the bending region,
            wherein the switching film in the rim region is thicker than the thickness in the bending region, and the switching film in the rim region is at most twice as thick as the thickness of the bending region;
    wherein the switching film across an entire expansion of the switching film has a thickness that varies by at more 50% of the thickness in the rim region;
    wherein the bending region in a radial direction of the plate-shaped flat body extends in a corrugated shape about the central closure region,
    wherein the reduced thickness of 0.3 mm or less in the plurality of corrugations in the bending region, despite stiffness of the PTFE material, provides a stretch-free bending movement of the switching film accomplished by a radii change of the plurality of corrugations, thereby reducing crack formation and bending fatigue in the PTFE material while enabling switching at pressure differences of 1 mbar to 100 mbar.

2. The switching film according to claim 1, wherein the central closure region is a cup-shaped bulge.

3. The switching film according to claim 1, wherein the plate-shaped flat body comprises a diameter that amounts to less than 150 mm.

4. The switching film according to claim 1, wherein the PTFE material is selected from the group consisting of polytetrafluoroethylene; polytetrafluoroethylene with admixtures; and thermoplastically processible polytetrafluoroethylene.

5. A unit for regulating or controlling a fluid pressure, the unit comprising:
    a valve housing comprising
        an inlet and
        an outlet;
    a housing cover secured onto the valve housing, the housing cover together with the valve housing enclosing an internal chamber formed between the housing cover and the valve housing;
    the switching film according to claim 1 disposed in the valve housing between the housing cover and the valve housing, the switching film dividing the internal chamber into a first chamber and a second chamber, the switching film for regulating, opening or blocking a flow of a fluid from the inlet to the outlet;
    wherein a radially outer portion of the switching film includes a clamping region;
    wherein the housing cover has an annular groove radially surrounding the first chamber;
    wherein the valve housing has an annular wall surrounding and radially enclosing the second chamber;
    wherein an axial outer end of the annular wall is received into the annular groove of the housing cover, the annular wall clamping the clamping region of the switching film in the annular groove of the housing cover.

6. The unit according to claim 5, wherein the bending region, when switching the switching film, moves the central closure region relative to a valve seat of the valve housing in an axial direction of the plate-shaped flat body toward the valve seat or away from the valve seat by the stretch-free bending movement.

7. The unit according to claim 6, wherein the central closure region comprises a cup-shaped bulge.

8. The unit according to claim 6, wherein the switching film has a diameter smaller than 150 mm.

9. The unit according to claim 5, further comprising an annular support ring arranged on the switching film;

a spring element arranged on a radially outer side of the valve seat, the spring element having a first end contacting the value housing and a second end directly contacting against the annular support ring;

wherein the spring element exerts a force on the switching film through the annular support ring;

wherein the spring element is supported by the annular support ring at the switching film.

10. The unit according to claim 9, wherein
the central closure region comprises a cup-shaped bulge.

11. The unit according to claim 10, wherein
the spring element is arranged about the cup-shaped bulge.

12. The unit according to claim 5, wherein
the switching film is movable between maximum positions in an open state and a closed state relative to a valve seat of the valve housing by applying an atmospheric pressure as a control pressure at one side of the switching film.

13. The unit according to claim 5, wherein
the switching film is movable between maximum positions in an open state and in a closed state relative to the valve seat by applying a control pressure that is different from an atmospheric pressure at one side of the switching film.

14. The unit according to claim 13, further comprising
a mechanical actuation means acting on the switching film and configured to switch the switching film.

15. The unit according to claim 5, further comprising
a mechanical actuation means acting on the switching film and configured to switch the switching film.

16. The unit according to claim 5, embodied as a valve for pressure regulation of an internal combustion engine or for pressure regulation of a crankcase of the internal combustion engine.

* * * * *

UNITED STATES PATENT AND TRADEMARK OFFICE
CERTIFICATE OF CORRECTION

PATENT NO. : 10,795,384 B2
APPLICATION NO. : 15/803976
DATED : October 6, 2020
INVENTOR(S) : Volker Kuemmerling, Thomas Jessberger and Lukas Bock It is certified that error appears in the above-identified patent and that said Letters Patent is hereby corrected as shown below:

In the Claims

In Claim 1, at Column 10, Lines 5-6, "at more 50%" should be changed to --at most 50%--.

Signed and Sealed this
Tenth Day of November, 2020

Andrei Iancu
*Director of the United States Patent and Trademark Office*